United States Patent
Schneider

[11] Patent Number: 5,871,319
[45] Date of Patent: Feb. 16, 1999

[54] ASSEMBLY ARRANGEMENT INCLUDING CUFF WITH RADIALLY INWARDLY PROTRUDING FASTENING REGION

[75] Inventor: Wilhelm Schneider, Rednitzhembach, Germany

[73] Assignee: Richard Bergner GmbH & Co., Schwabach, Germany

[21] Appl. No.: 773,301

[22] Filed: Dec. 23, 1996

[30] Foreign Application Priority Data

Dec. 23, 1995 [DE] Germany .................. 195 48 774.5

[51] Int. Cl.⁶ .................................................. F16B 39/00
[52] U.S. Cl. .......................... 411/107; 411/353; 411/999
[58] Field of Search .............................. 411/107, 44, 45, 411/57, 352, 353, 999, 970

[56] References Cited

U.S. PATENT DOCUMENTS

| | | | |
|---|---|---|---|
| 2,668,468 | 2/1954 | Flogaus | 411/57 |
| 3,690,705 | 9/1972 | Ygfors . | |
| 4,732,519 | 3/1988 | Wagner | 411/353 |
| 4,952,107 | 8/1990 | Dupree | 411/353 |
| 5,094,579 | 3/1992 | Johnson . | |
| 5,255,647 | 10/1993 | Kiczek | 411/107 |
| 5,462,365 | 10/1995 | Damm | 411/107 |

FOREIGN PATENT DOCUMENTS 0 272 642  6/1988  European Pat. Off. .
0 618 385  10/1994  European Pat. Off. .
95/21335  8/1995  WIPO .

*Primary Examiner*—Flemming Saether
*Attorney, Agent, or Firm*—Venable; Gabor J. Kelemen

[57] ABSTRACT

An assembly arrangement includes: an assembly element defining a mounting hole therein; and a cuff inserted into the mounting hole in a vibration-damping manner, the cuff being made of an elastic rubber material and defining a through hole therein. The cuff further includes a cuff neck resting in the mounting hole and defining, over an entire length thereof, an outer circumferential surface extending essentially along a longitudinal axis of the cuff, and a fastening region having an inner wall which protrudes radially inwardly into the through hole, the fastening region extending over a portion of a circumference of the through hole. The assembly arrangement further includes: an assembly sleeve inserted into the through hole and including a jacket having a circumferential configuration such that when the assembly sleeve passes through the fastening region of the cuff, it widens the inner walls of the fastening region in a radial direction thereby fastening the cuff and the assembly sleeve in the mounting hole; and a screw. The screw includes a screw shaft inserted into the assembly sleeve and a screw head adjacent the screw shaft, wherein the cuff is configured such that it is acted upon in a tightening direction of the screw by at least one of the screw head and an annular collar of the assembly sleeve.

21 Claims, 14 Drawing Sheets

ASSEMBLY ARRANGEMENT INCLUDING CUFF WITH RADIALLY INWARDLY PROTRUDING FASTENING REGION

FIELD OF THE INVENTION

The invention relates to an assembly element with a vibration-damping mounting hole. Assembly elements, such as cylinder head caps, housing caps or the like, are provided with mounting holes, with which they can be mounted via screws on a counterpart, such as a machine part. It is often desirable for the assembly elements to be fastened in a vibration-damped fashion. In these cases the mounting holes of the assembly elements are lined with a cuff made of an elastic, rubberlike material, or are penetrated by such a cuff. The task of the cuff is to space the screw, or in very general terms an assembly bolt, apart from the assembly element, such as a cylinder head cap, in such a way that there is no direct contact between the assembly bolt and the assembly element or the machine part. The cuff does not serve this spacing purpose but instead is used in particular to prevent a transmission of vibration between the parts connected to one another, thereby preventing mutual vibrational influence and suppressing the development of noise.

To enable the fastening pressure exerted by the head of the assembly bolt or the screw head of a screw to be transmitted to the machine part with which the assembly element of the invention is to be connected, an assembly sleeve is provided. The assembly sleeve, in the assembled state, penetrates a through hole of the cuff and is in turn penetrated by the shaft of an assembly bolt, which will hereinafter be referred to for simplicity as a screw.

It is often necessary that the mounting holes of the assembly elements already be equipped with appropriate fastening means. The cuff, assembly sleeve and possibly also the screw must therefore be fastened in the mounting hole of the assembly element in captive fashion to secure against their being lost. In European Patent Disclosure EP 0 272 642 B1, an assembly element of this generic type is described in which the cuff takes the form of a cylindrical sleeve with a formed-on annular collar toward the screw head. In the assembly position, the sleeve jacket lines the mounting hole over the entire axial length and engages it from behind on its end remote from the mounting head or in other words toward the machine part. To accomplish this engagement from behind, the assembly sleeve is widened in funnel-like fashion on its end remote from the head, and as a result of this widening it effects a radial deflection or extension from the end remote from the head of the cuff, in order to clamp the cuff in the mounting hole. Mounting the cuff and the assembly sleeve in the mounting hole of an assembly element seems problematic, regardless of whether the cuff is introduced first into its desired position in the mounting hole before the assembly sleeve is inserted, or whether the cuff is inserted in the state where the assembly sleeve has already been put in place.

SUMMARY OF THE INVENTION

The object of the invention is to embody an assembly element of the type referred to at the outset, having a mounting hole lined with a cuff and having an assembly sleeve that in turn holds this cuff in the fastening position and receives the screw shaft, in such a way as to enable economical manufacture and in particular simple assembly.

This object is attained by an assembly element where the through hole of the cuff has a radially inward-protruding fastening region that extends over a portion of its circumference. The jacket of the assembly sleeve is of a diameter and circumferential shape such that on passing through the fastening region, it first widens the inner wall thereof in the radial direction in such a way that the assembly sleeve and the cuff are fastened in the mounting hole. This feature first simplifies the production of a cuff, since it has no undercuts, such as an annular groove, in its through hole and is therefore easily unmolded during production by means of an injection molding process or the like. Because the cuff neck has a circumferential face extending substantially parallel to the longitudinal axis of the cuff, the cuff can be inserted into the mounting hole of an assembly element without exerting major force. For fastening the cuff in the mounting hole, the assembly sleeve need not have any radially outward-protruding regions, produced with additional production effort, but can instead be equipped with a cylindrical jacket, for instance. The fastening region of the cuff does not become operative until the sleeve, on insertion into the cuff, approaches the smallest diameter region of the fastening region. Only then is the fastening region widened radially outward, as a result of which the cuff and assembly sleeve are fastened positively or nonpositively in the mounting hole of the assembly element. The cuff can also be initially fastened to the assembly sleeve by frictional or positive engagement, by being thrust onto the assembly sleeve far enough that its jacket does not yet cooperate with the fastening region. The cuff partly encompassing the assembly sleeve can then, again without exerting major force, be inserted into a mounting hole. Not until the assembly sleeve has been pressed all the way into the through hole of the cuff does the fastening region of the cuff widen, which accomplishes the aforementioned fastening. Preferably, the fastening region is disposed near the neck end of the cuff. The advantage of this provision is that with the cuff resting in the mounting hole, the assembly sleeve can initially be inserted relatively far into the through hole of the cuff without major expenditure of force. Only toward the end of the insertion motion is a greater expenditure of force necessary, namely once the fastening region cooperates with the jacket of the assembly sleeve. The same is true if the cuff is first slipped onto the assembly sleeve and the thus-created unit is then inserted into the mounting hole. In a preferred embodiment, the assembly element, in the region of its mounting hole, has an undercut that flanks the fastening region of the cuff neck. The inner wall, associated with the fastening region, of the through hole tapers at least partly in the manner of a funnel in the tightening direction toward the neck end of the cuff. The jacket of the assembly sleeve is of a diameter and circumferential form such that on its passage through the cuff neck, it widens this neck in the radial direction in such a way that on the one hand it engages the undercut from behind in the region of the mounting hole and on the other it is fastened inside the cuff by elastic restoring forces.

Preferably, the undercut is formed by an annular protrusion that protrudes radially inward from the wall of the mounting hole. The diameter of the cuff neck is selected such that, over its entire length, it is substantially equal to less than the diameter of the bottleneck, defined by the annular protrusion, of the mounting hole of the machine part. In this way it is assured that the cuff—with or without an assembly sleeve—can easily be inserted into the mounting hole. Assembly elements of this type are usually embodied such that the head end of the mounting hole is radially widened, forming a receptacle for a flangelike cuff head formed onto the head end of the cuff neck. In that case, the annular protrusion is preferably disposed on the head end of the mounting hole near the screw head. In this way, the axial structural length of the cuff can be reduced, thereby saving material.

Preferably, the top side of the annular protrusion, toward the screw head, extends in the same plane as the bottom face of the receptacle. The annular protrusion is embodied such that it has a wall region, extending from its top side toward the screw head to the neck end, in the form of a cylindrical jacket face that bounds or defines the bottleneck of the through hole. The cylindrical jacket face, on the introduction of the cuff into the mounting hole, cooperates in the manner of a sliding guide, which makes installing the cuff in the mounting hole easier.

Preferably, in the bearing face of the assembly element remote from the screw head, a damping lip is disposed, protruding from this face and annularly encompassing the mounting hole. This provision serves the purpose of further reducing vibration transmission between an assembly element and some subconstruction or machine part.

In another preferred embodiment of the assembly element according to the invention, the undercut of the mounting hole is formed in that it widens, with an annular shoulder extending radially outward, to form a region of larger diameter. In a further advantageous embodiment, the undercut is formed by the edge region of the end remote from the head of the mounting hole. In both cases, it may be advantageous if the fastening region is subdivided by a plurality of radial slits, for instance, into a plurality of circle-segmental back-engagement parts disposed in rosette fashion around the longitudinal axis of the cuff. On the passage of the jacket of the assembly sleeve through the fastening region of the cuff, these back-engagement parts are moved into the radially widened region or underneath the edge of the end of the mounting hole remote from the head. The advantage of this feature is primarily that engagement from behind can be created with a very great mutual overlap of the back-engagement parts. A cuff penetrated by an assembly sleeve can in this way be fastened very firmly and absolutely secure against loss to an assembly element. This is especially important whenever assembly elements are to be shipped in preassembled state and therefore care must be taken to prevent the cuff and the assembly sleeve from being lost along the way. The back-engagement parts created by the radial slitting taper in wedgelike fashion toward the neck end of the cuff. This is advantageous if the back-engagement parts in the assembled state are intended to act as additional damping elements between the assembly element and a machine part or subconstruction connected to it. By means of the wedge shape, in the circumferential direction between the individual back-engagement parts, an interstice is created that the back-engagement parts can fill upon axial compression and the attendant elastic widening in the circumferential direction, for instance when braced against a machine part.

The region adjoining the fastening region of the through hole of a cuff toward the head is embodied such, and has an inside diameter such, that an assembly sleeve inserted into this region, acting as a prefastening region, is fastened with positive engagement. In this way it is assured that cuffs in the course of preassembly can be secured in captive fashion to assembly sleeves. To make this fastening even more secure, a positive engagement may also be provided between the assembly sleeve and the cuff, for instance by providing that an annular protrusion or a plurality of dotlike fastening bumps protrude radially outward from the end of the assembly sleeve jacket remote from the head.

BRIEF DESCRIPTION OF THE DRAWINGS

The invention will now be explained in further detail in terms of the exemplary embodiments shown in the accompanying drawings. Shown are.

DETAILED DESCRIPTION OF THE INVENTION

Figure 1:
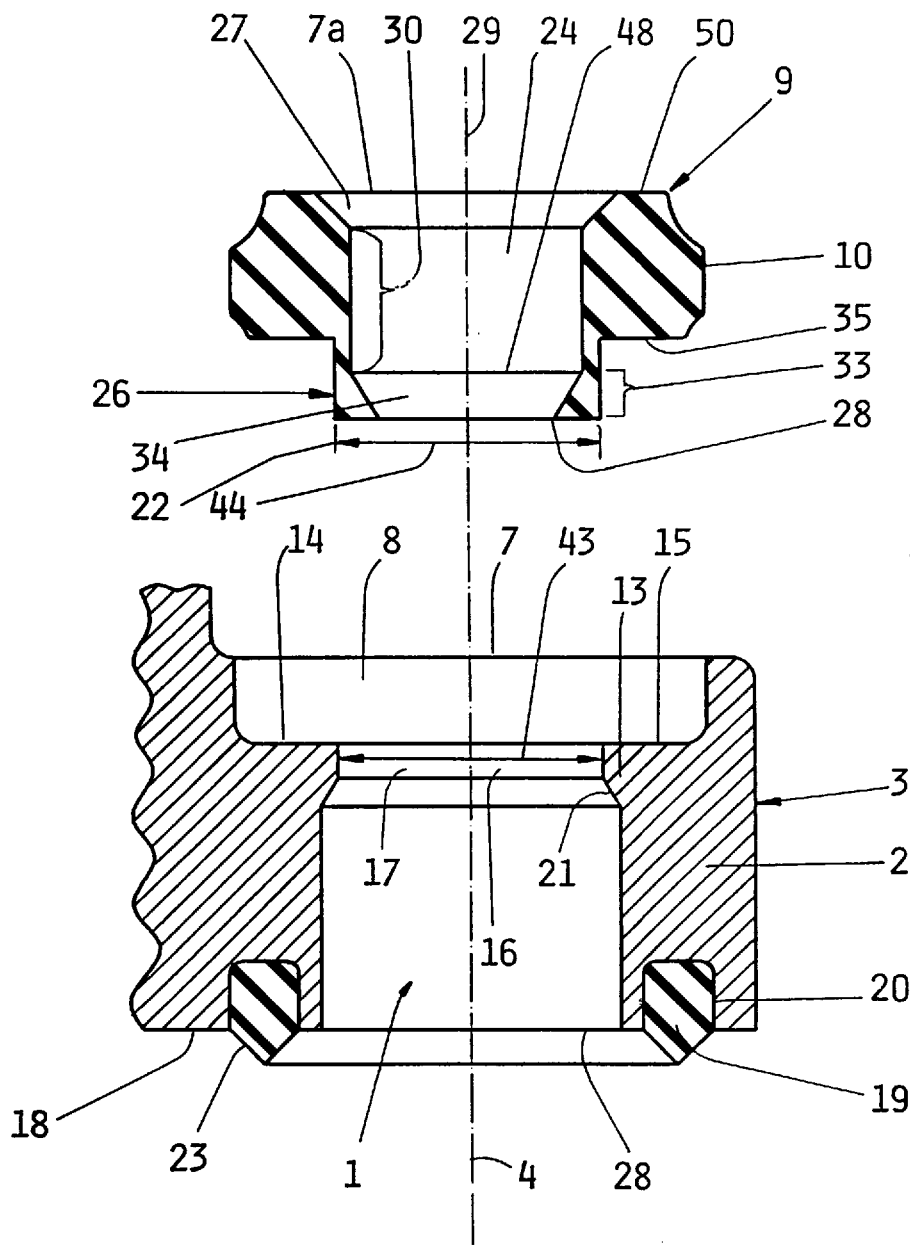
FIG. 1, a sectional view of a cuff and below it, in a position ready to receive it, the region of an assembly element, namely its mounting flange provided with a mounting hole.

In the lower portion of FIG. 1, the flange 2, provided with a mounting hole 1, of an assembly element 3 is shown in cross section. The assembly element may for instance be a cylinder head hood, and extends over the circumferential region of its longitudinal axis 4. The mounting hole 1 extends through the flange 2, and on its head end 7 that in the assembled state is toward the screw head 5 of a screw 6 (see FIG. 2, for instance), it has a radial widening that forms a receptacle 8 for the cuff head 9 of a cuff 10 of rubber-elastic material that rests in the mounting hole 1 in the assembled state. The transitional region between the receptacle 8 and the region of the mounting hole 1 having the smaller diameter is embodied in the manner of an inward-protruding annular protrusion 13. The top side 14 of the annular protrusion is disposed in the same plane as the bottom face 15 of the receptacle 8. The annular protrusion delineates a bottleneck 16 in the mounting hole 1. In the region of the annular protrusion 13, the inner wall of the mounting hole has two different wall regions. A first wall region defines a bottleneck 16 and is a cylindrical jacket face 17 disposed coaxially with the longitudinal axis 4. It is adjoined by an oblique shoulder, which widens the mounting hole 1 in the manner of an inverted conical face and forms an undercut 21 remote from the receptacle 8.

Figure 4:
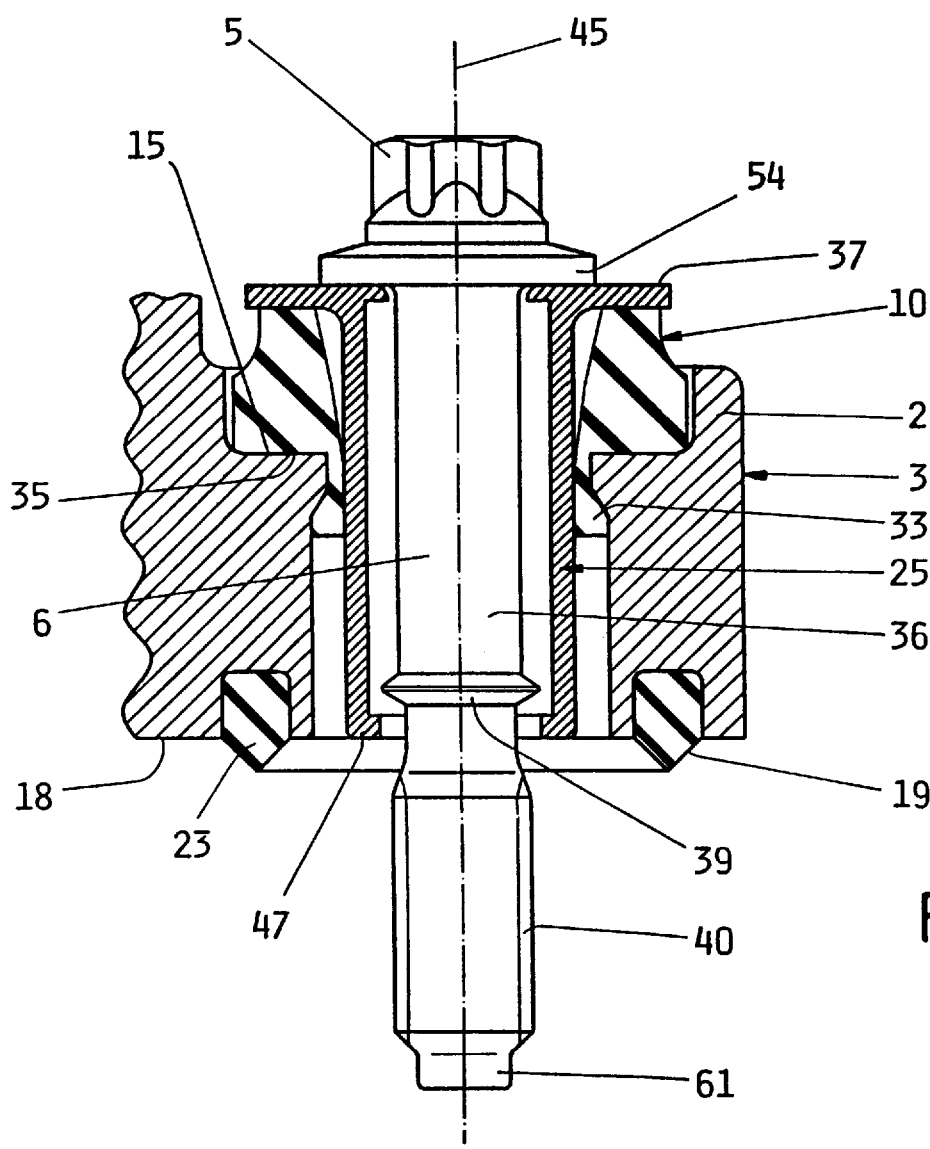
FIG. 4, a partially sectional view of a cuff and a mounting flange in their assembly position.

A damping lip 19, which annularly surrounds the mounting hole 1, is disposed on the bearing face 18 of the assembly element 3, which face is remote from the screw head 5 in the mounted state shown in FIG. 4. The damping lip rests in an annular groove 20 in the bearing face 18 and protrudes from it with a region 23 of peaked or wedgelike cross section.

Figure 2:
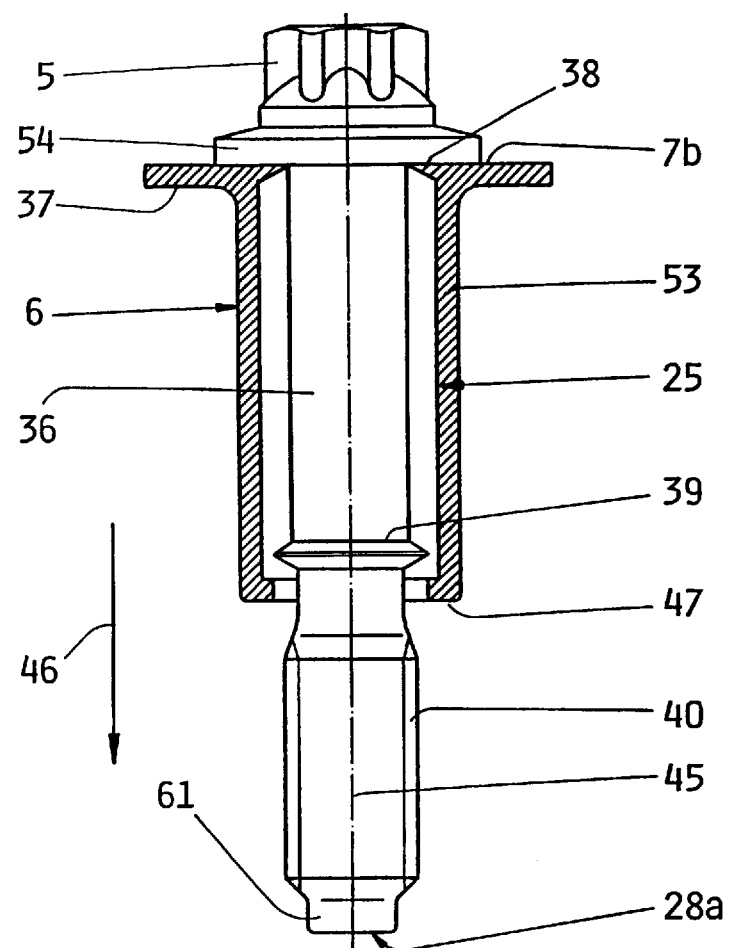
FIG. 2, a partially sectional view of an assembly sleeve with a screw therein.
Figure 5:
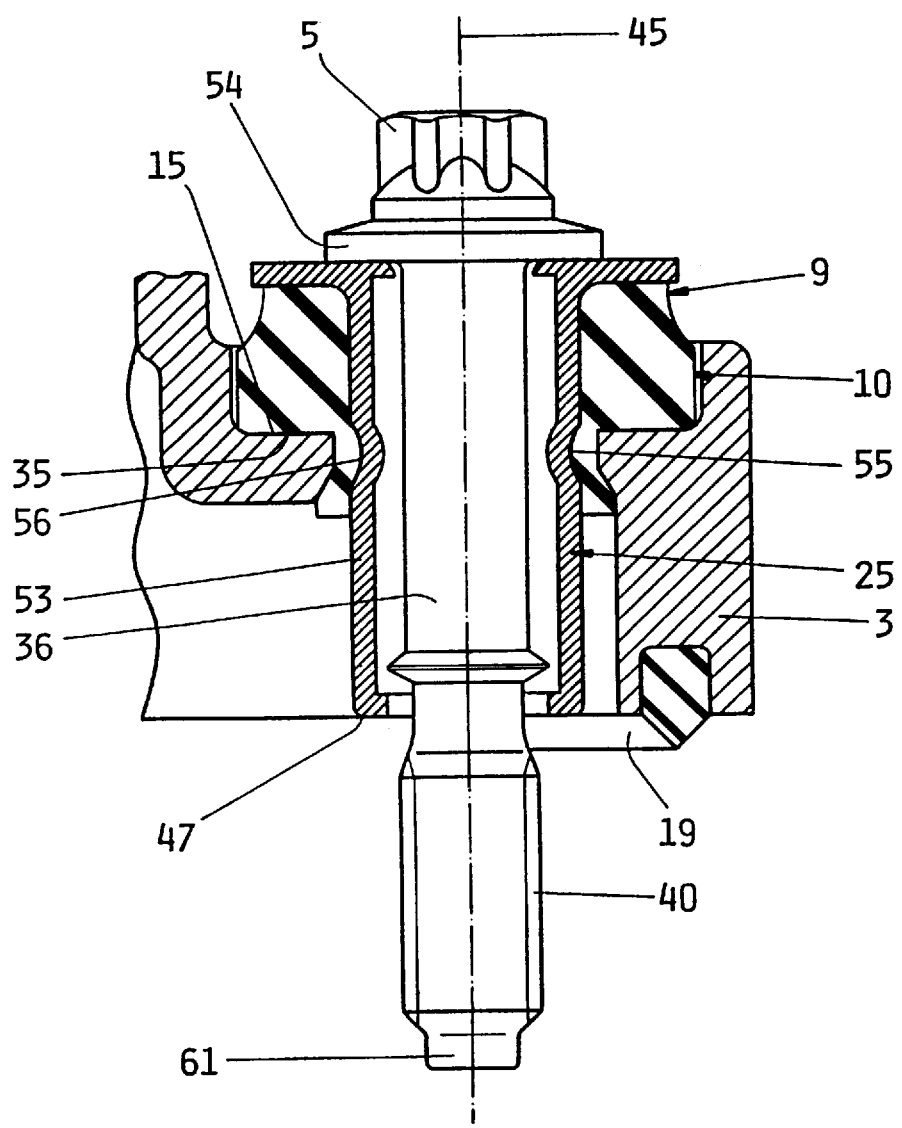
FIG. 5, a view similar to FIG. 4 showing a further embodiment of the invention.
Figure 6:
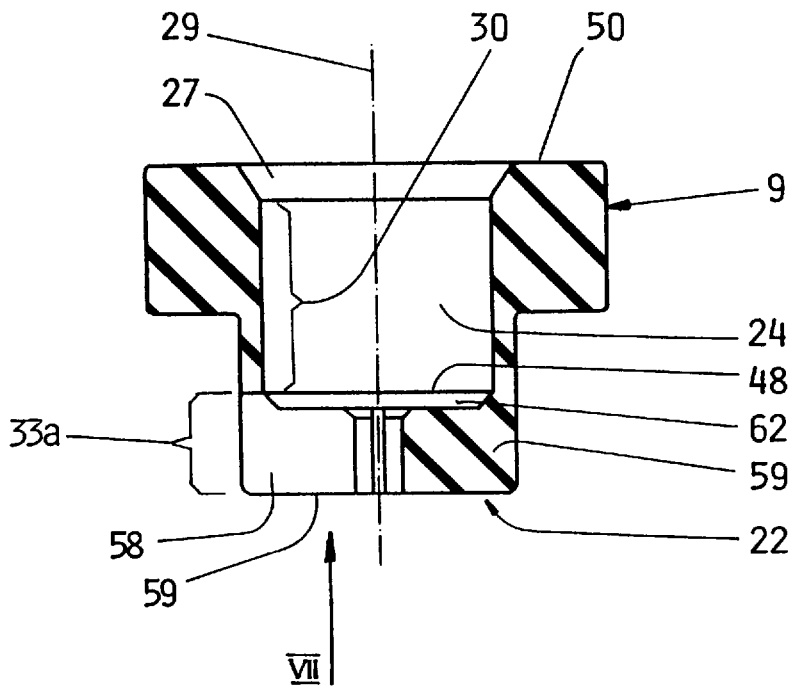
FIG. 6, a longitudinal section taken along the line VI—VI of FIG. 7 through a cuff with a radially slit fastening region.
Figure 7:
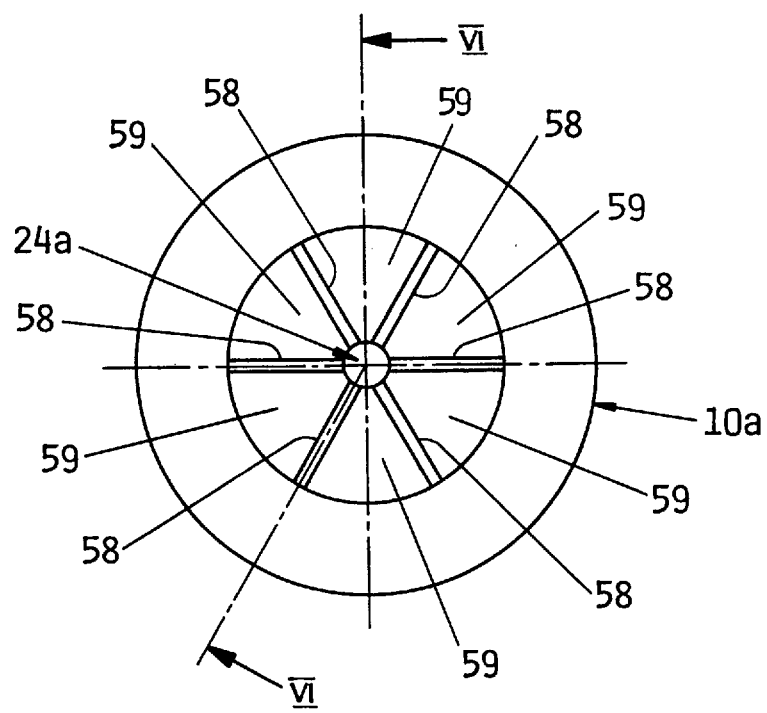
FIG. 7, a view of the assembly sleeve in the direction of the arrow VII of FIG. 6.

The cuff 10 is an essentially sleevelike part having a through hole 24 that serves to receive an assembly sleeve 25 (FIGS. 2, 4, 5). The upper region of the cuff, toward the screw head 5 in the assembled state of FIG. 4, is widened radially and forms the cuff head 9. The end remote from the screw head 5 is a neck portion, namely a cuff neck 26 (FIG. 1), of reduced diameter compared with the cuff head 9. The through hole 24 is widened in funnel-like fashion on the head end 7a of the cuff 10. This widened through hole region forms an insertion bevel 27 that makes it easier to insert the assembly sleeve 25. The insertion bevel is adjoined, in the direction toward the neck end 22 of the cuff 10, by a wall region that is embodied by a cylindrical jacket face and extends coaxially to the longitudinal axis 29 of the cuff 10. As will be explained hereinafter, this region serves as a prefastening region 30 for fastening the cuff 10 to an assembly sleeve 25. The prefastening region 30 extends partway into the cuff neck 26. It is adjoined by a fastening region 33, in which the through hole 24 tapers in the manner of a funnel. Accordingly the inner wall of the through hole 24 in this region is for instance an inverted conical face 34 that narrows toward the end 28 remote from the head. In the assembled state, the cuff head 9 rests with a bearing face 35 on the bottom face 15 of the receptacle 8.

The screw 6 shown in FIG. 2 has besides a screw head 5 a shaft 36 extending away from the head. With this shaft, the screw 6 penetrates the assembly sleeve 25. The head end 7b of the assembly sleeve has a radially outwardly extending annular collar 37. A plurality of fastening protrusions 38 protrude inward from the inner edge of this annular collar. They cooperate with a fastening flange 39, radially protruding from the shaft circumference, to form a fastening of the screw 6 to the assembly sleeve 25 in captive fashion. A thread 40 is disposed on the end 28a of the shaft 1 remote from the head.

Figure 3:
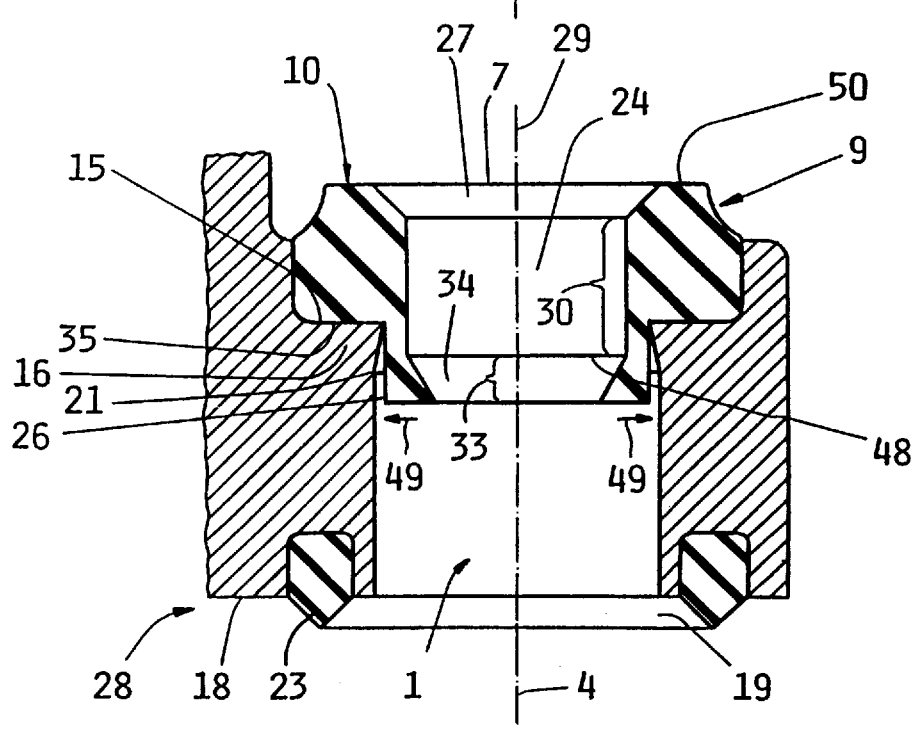
FIG. 3, a view similar to FIG. 1, but in which the cuff rests in the mounting hole of the assembly element.

FIG. 3 shows a preassembled state, in which the cuff 10 with its neck 26 rests in the mounting hole 1 and with its head 9 in the receptacle 8. The diameter 43 of the bottleneck 16 is preferably somewhat greater than the outer diameter 44 of the cuff neck 26. This assures that the cuff 10 can be inserted into the mounting hole 1 with the least possible exertion of force. The cylindrical jacket face 17 (FIG. 1) of the annular protrusion 13 acts in the manner of a sliding guide that directionally stabilizes the insertion motion.

The fastening of the cuff 10 inserted into the mounting hole 1 is accomplished by introducing the assembly sleeve 25 into the through hole 24 of the cuff 10. Preferably, an assembly sleeve 25 is used in which the screw 6 is held with its shaft 36 captive.

The assembly of the aforementioned individual parts in a mounting hole is performed approximately as follows: Beginning with the mutual position shown in FIG. 2 and FIG. 3, in which the longitudinal axis 45 of the screw 6 is approximately aligned with the longitudinal axis 4 of the mounting hole 1 or the longitudinal axis 29 of the cuff 10, the assembly sleeve 25 is introduced into the through hole 24 in the tightening direction 46, and thus centers the flangeless end 47 of the assembly sleeve 25 by means of the insertion bevel 27. The sleeve, with its end 47, then reaches the prefastening region 30 of the through hole 24. Not until the end 47 of the assembly sleeve 25 has reached the seam line 48 between the prefastening region 30 and the fastening region 33 is this latter region radially widened in the direction of the arrows 49 in such a way that its outer circumference, which in the outset state is cylindrical, now assumes approximately the circumferential form of a cone widening in the tightening direction 46; this cone fills up the undercut 21 and with positive engagement clenches the cuff 10 inside the mounting hole 1.

The assembly sleeve 25 is introduced into the through hole 24 until its annular collar 37 strikes the top face 50 of the cuff 10. In this position (FIG. 4), the assembled state is reached. In this assembled state, because of the intrinsic elastic restoring forces, particularly of its neck 25, the cuff 10 surrounds the assembly sleeve 25 with frictional engagement. The assembly sleeve is thus retained virtually captive in the mounting hole 1. In the exemplary embodiments of FIGS. 1–5, the end 28 of the mounting hole 1 remote from the head is bordered by the damping lip 19 protruding from the bearing face 18 of the assembly element 3. The jacket 53 of the assembly sleeve 25 is of an axial length such that the damping lip 19, in final assembly to an underlying frame or machine part, undergoes limited deformation, which assures the sealing and damping action completely and for the entire service life.

FIG. 5 shows an embodiment which differs from the embodiment shown in FIGS. 1–4 essentially in only two details. The first detail pertains to the absence of an annular collar on the assembly sleeve 25. The cuff 10 or its top face 50 is acted upon directly here by a flange 54 of the screw head 5. The flange 54, which is also present in the embodiment of FIGS. 1–4, can in this case have a greater radial extent. Another distinguishing detail is the embodiment of the jacket 53 of the assembly sleeve 25. This jacket has a circumferential region which is acted upon by the fastening region 33 and in which an annular circumferential groove 55 is embodied. This groove, in addition to the friction seat described above, establishes an additional positive engagement between the cuff neck 26 and the jacket 53 of the assembly sleeve 25. To that end, the inner wall of the through hole of the cuff may also be equipped, in the back-engagement region 33, with a suitably embodied annular protrusion 56.

The drawings in FIGS. 6–12 illustrate a further embodiment of an assembly element according to the invention. A first substantial distinction from the embodiments described above is that the undercut 21 cooperating with the cuff 10a, is formed by the peripheral region 57 (FIG. 9) of the mounting hole (1) remote from the screw head 6. The assembly element 3a can in this case be a flat part, for instance, a platelike part. Another essential distinction is that the fastening region 33a is subdivided by radial slits 58 into a plurality of back-engagement parts 59, for instance a total of six such parts. The funnel-like tapering of the through hole of the cuff 10a is also differently embodied. The inner wall of the through hole 24 tapers radially inward in the manner of an annular shoulder at the beginning of the fastening region 33a. The back-engagement parts 59 extend to nearly the center longitudinal axis 29 of the cuff 10a, or nearly abut one another at the center of the through hole 24. They are essentially circular-segmental in shape, and their inner edge regions pointing inward and toward the screw head 6 have a chamfer 60. The chamfers 60 of all the back-engagement parts 59 form what amounts to virtually a funnel, widening toward the screw head 6, that cooperates with the headless end 28a of a screw, such as the locator tip 61 (FIG. 2).

Figure 8:
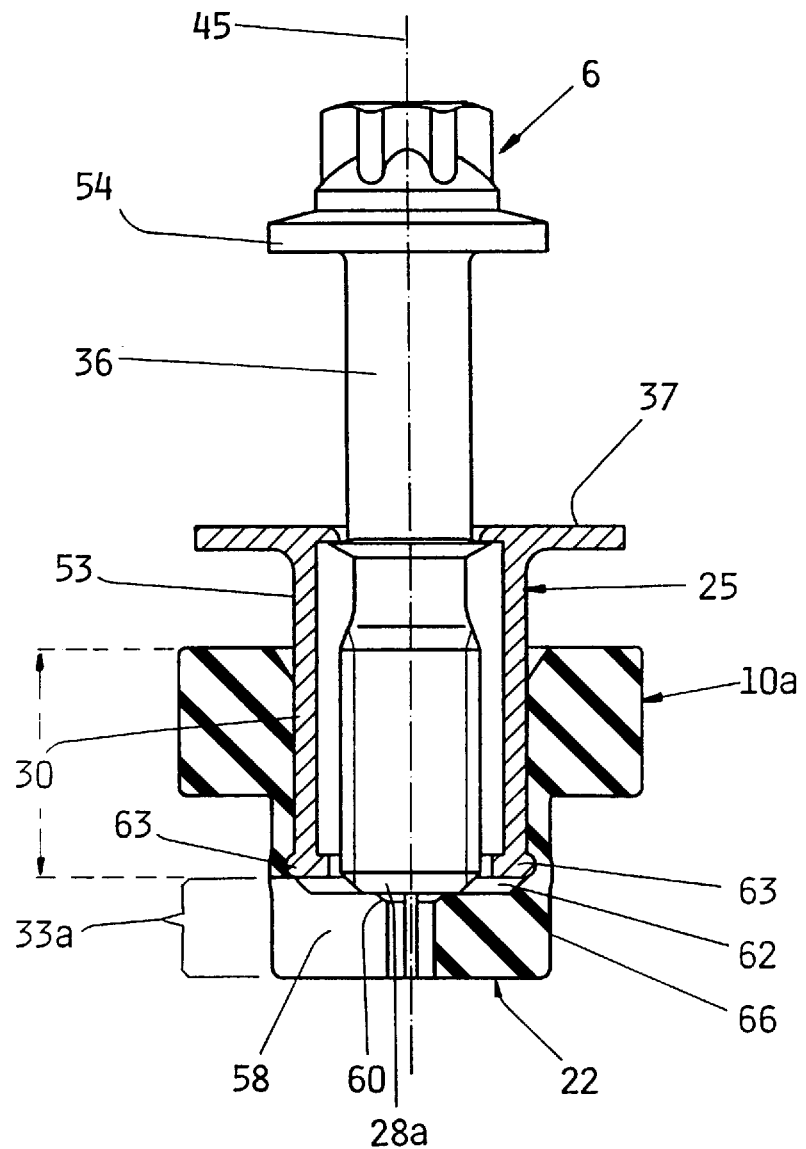
FIG. 8, a partially sectional view of a screw, an assembly sleeve and a cuff in their prefastened state.
Figure 9:
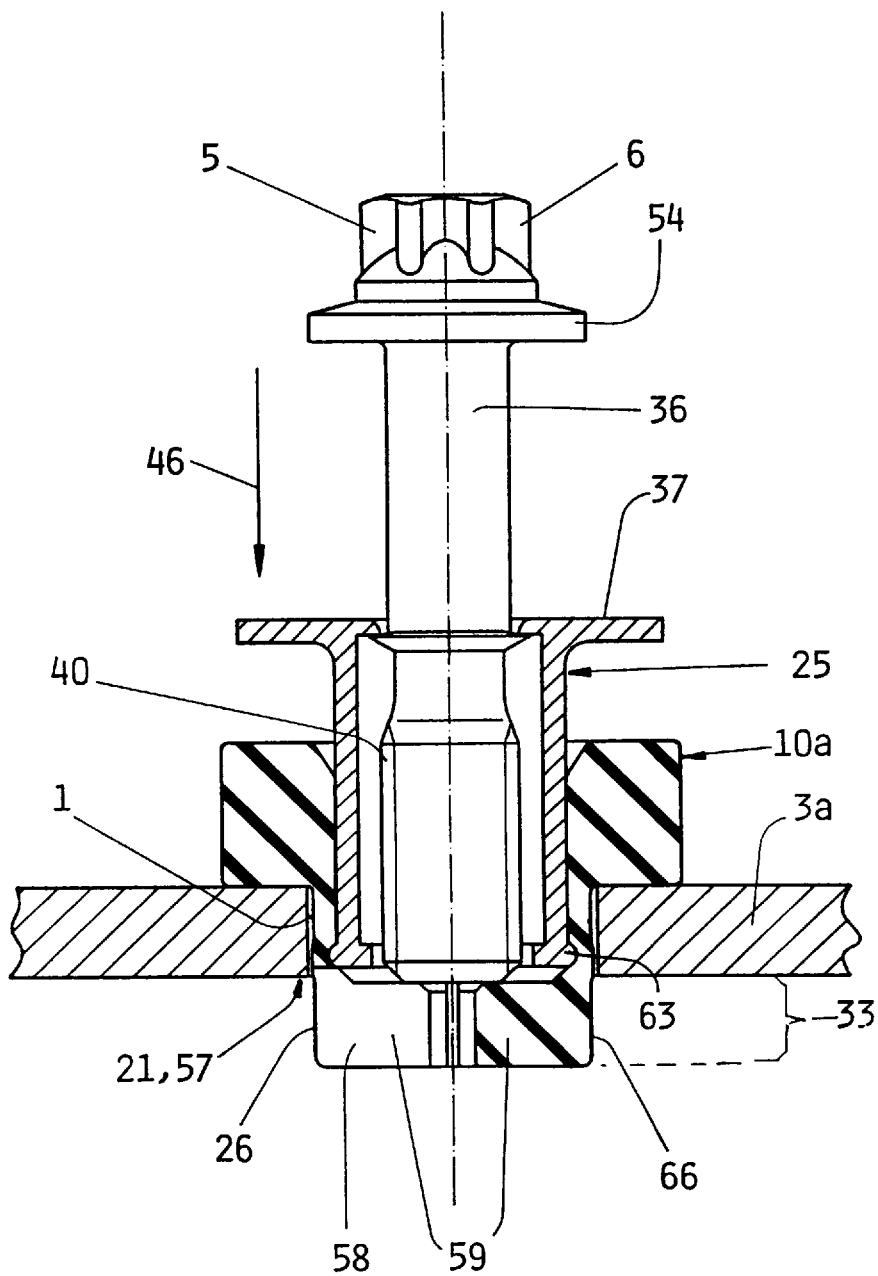
FIG. 9, a partially sectional view of an arrangement corresponding to FIG. 8 inserted into a mounting hole of an assembly element.
Figure 10:
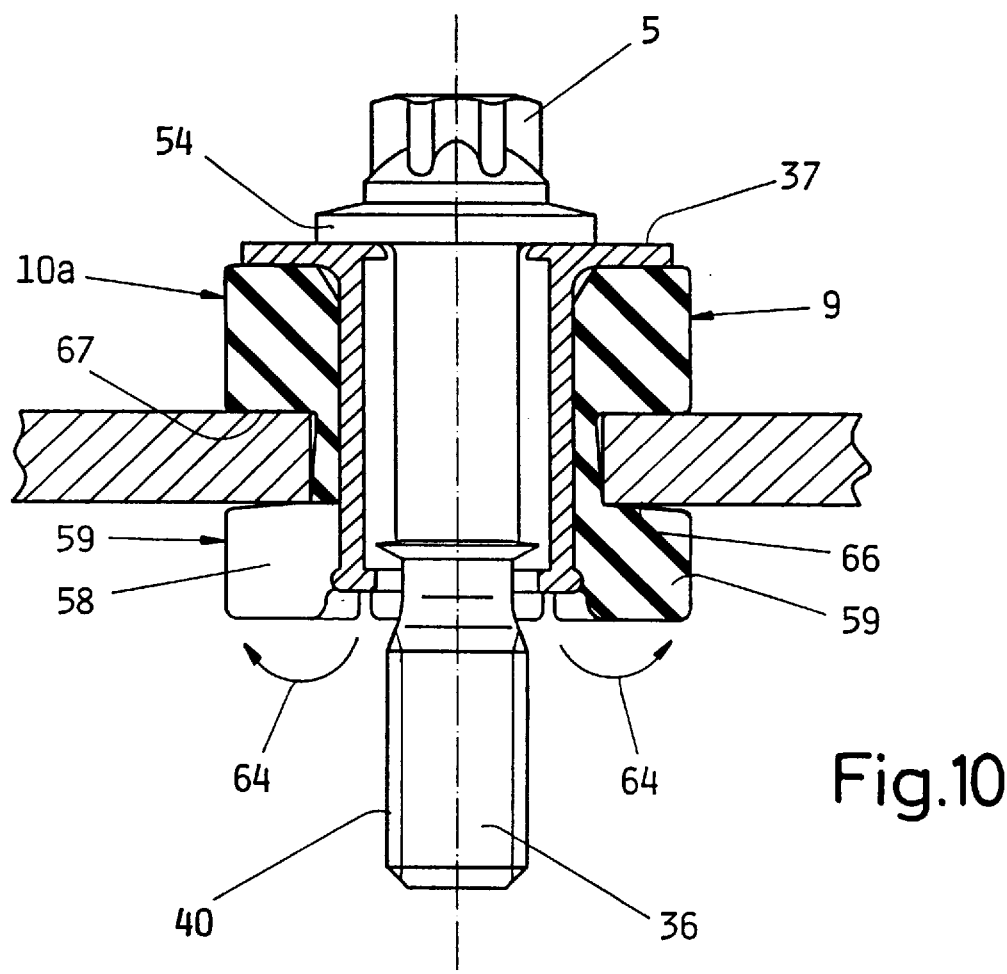
FIG. 10, their individual parts of FIG. 9 in the assembled state.

To mount a cuff 10a in a mounting hole 1 of an assembly element 3a, the procedure may be first such that the cuff 10a is fastened with its prefastening region 30 to the assembly sleeve 25. To increase the strength of this fastening, an annular protrusion or fastening bumps 63 may be provided on the end 47 of the assembly sleeve 25 remote from the head; these bumps protrude radially outward from the jacket 53 and cooperate with the prefastening region of the cuff 10a. A prefastened unit of this kind, comprising the screw 6, assembly sleeve 25 and cuff 10a, is mounted in a mounting hole 1 of an assembly element 3a as follows: first, the cuff 10a is introduced by its neck 26 into the mounting hole, until the cuff head 9 rests on the assembly element 3a. Before the above step, is the assembly sleeve 25 is already equipped with a screw 6, as shown in FIGS. 8 and 9, then this screw is disposed such that its thread 40 is located inside the assembly sleeve 25. This ensures that when the cuff neck 26 is introduced into the mounting hole 1, the back-engagement parts 59 will initially remain in their outset position. Taking the situation shown in FIG. 9 as a point of departure, the shaft 36 and the assembly sleeve 25 are in the lead as they are driven in the tightening direction 46 into the cuff, then the fastening region 33 is radially widened in that the back-engagement parts 59 are swiveled radially outward in the direction of the arrows 64 by an angle of approximately 90°. Preferably, a region in the form of a cone face 62 is embodied adjoining the seam line 48. This facilitates the insertion of the assembly sleeve 25 and the attendant radial motion of the back-engagement parts 59 apart from one another. They rest with their outer face 66, which in the prefastening state of FIG. 9 extends approximately at right angles to the plane of the assembly element 3a, on the undercut 21 or peripheral region 37 of the hole. The assembly sleeve 25 and the cuff 10a are in this way both reliably fastened to the assembly element 3a. In this assembled state (corresponding to FIG. 10), the outer faces 66, pivoted 90° toward the assembly element 3a, together with the cuff head 9 form virtually an annular receiving groove 67, which receives the peripheral region of the mounting hole 1 in itself.

Figure 11:
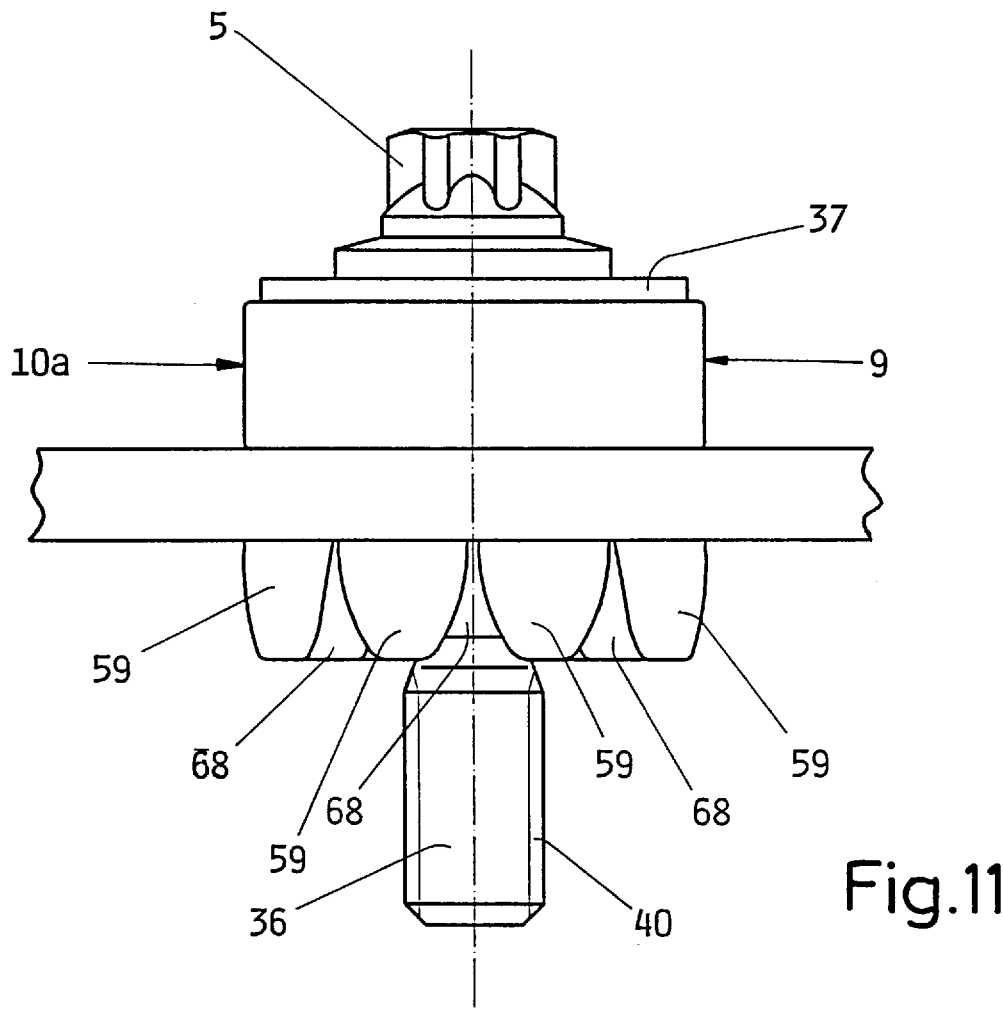
FIG. 11, a perspective view of the assembled state of FIG. 10.
Figure 12:
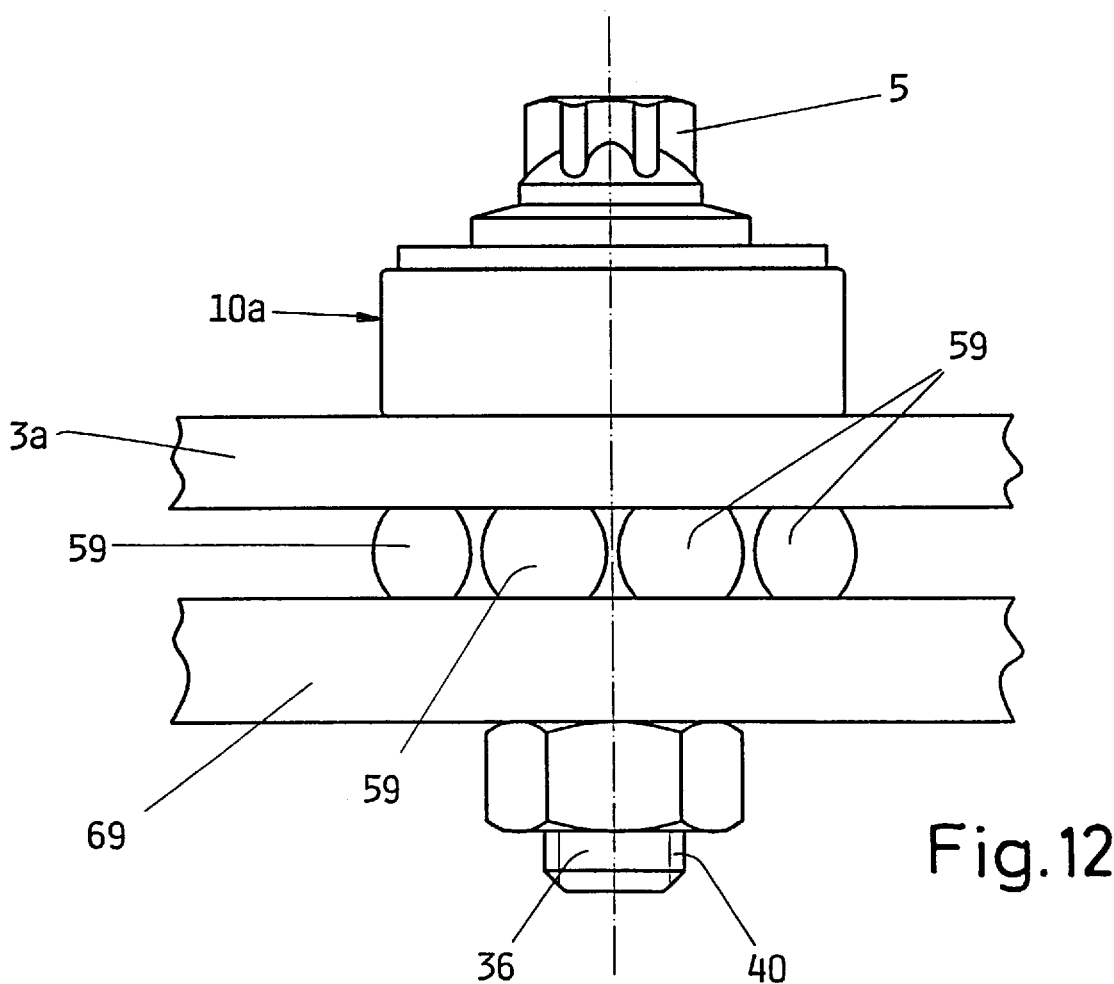
FIG. 12, a perspective view that shows the individual parts in the final assembled state or in other words connected to a subconstruction or machine part.

As can be seen particularly from FIG. 11, the back-engagement parts 59, because of their initial shape, are embodied as wedgelike, such that their width decreases toward their free end. In the circumferential direction, wedge-shaped interstices 68 are therefore present between the back-engagement parts 59. If the mounting unit shown in FIG. 11 is connected to a subconstruction or machine part 69, then the back-engagement parts 59 are compressed in the axial direction. In the process they are shortened in the axial direction and widened in the circumferential direction, so that in the final assembly state shown in FIG. 12, they virtually completely fill the interstices 68 originally present between them. The back-engagement parts 59 thus have a dual function. On the one hand, they serve to establish an engagement from behind for prefastening the cuff 10a to an assembly element 3a. On the other, they act as damping elements between an assembly element 3a and a subconstruction or machine part 69.

Figure 13:
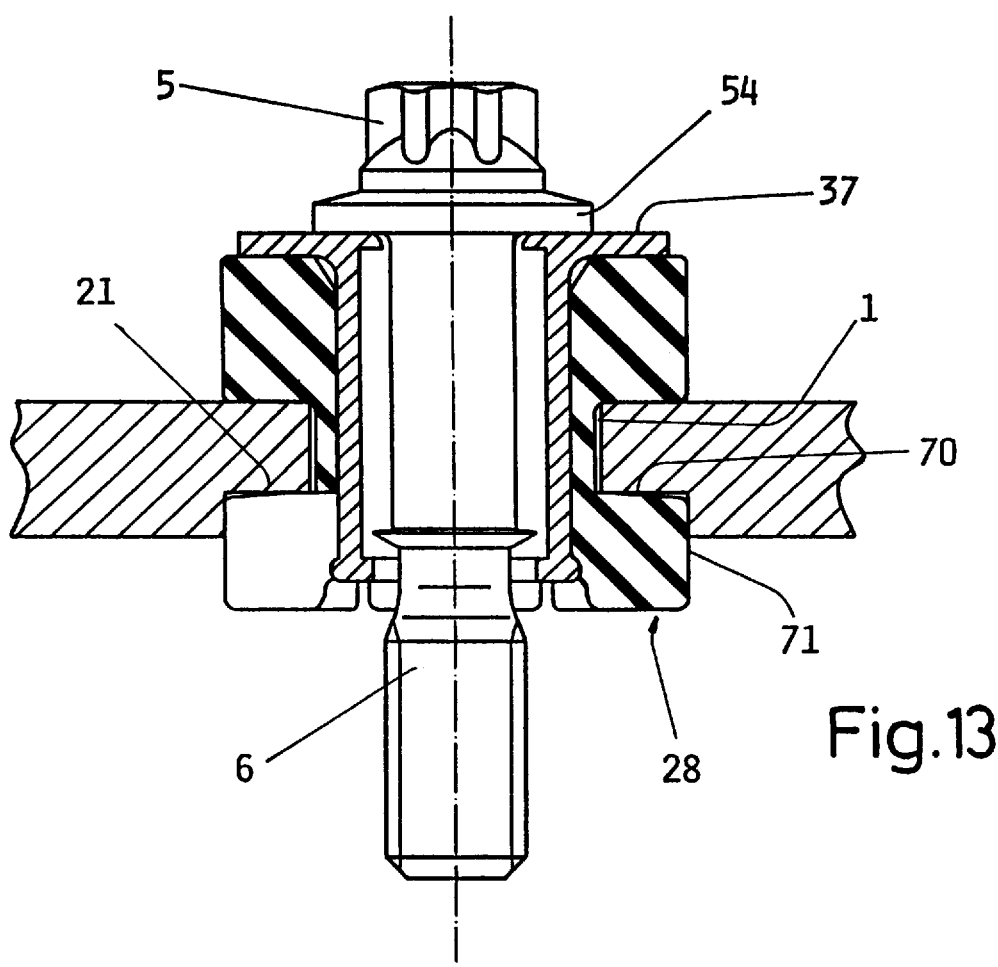
FIG. 13, a view corresponding to FIG. 10, but showing a further embodiment of the assembly element.

The embodiment shown in FIG. 13 differs from that of FIGS. 8–12 only in that the mounting hole 1 widens radially toward its end 28 remote from the head. The transition between the region of smaller diameter and the region of larger diameter is a radially extending annular shoulder 70, which forms the undercut 21. In this embodiment, the back-engagement parts 59 are located in an approximately cup-shaped chamber and are surrounded by the wall 71 of the radially widened region of the mounting hole.

Figure 14:
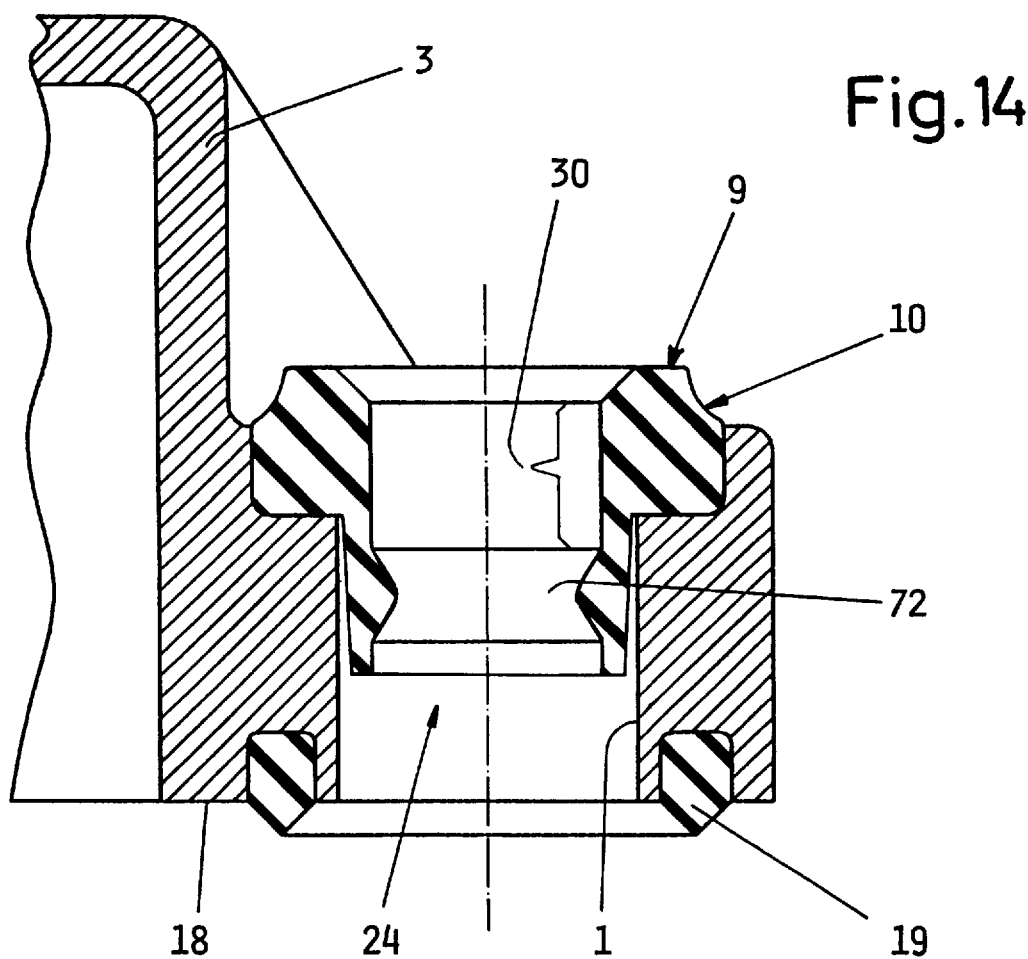
FIG. 14, a sectional view of a further embodiment of a fastening region of a cuff resting in the mounting hole of an assembly element.
Figure 15:
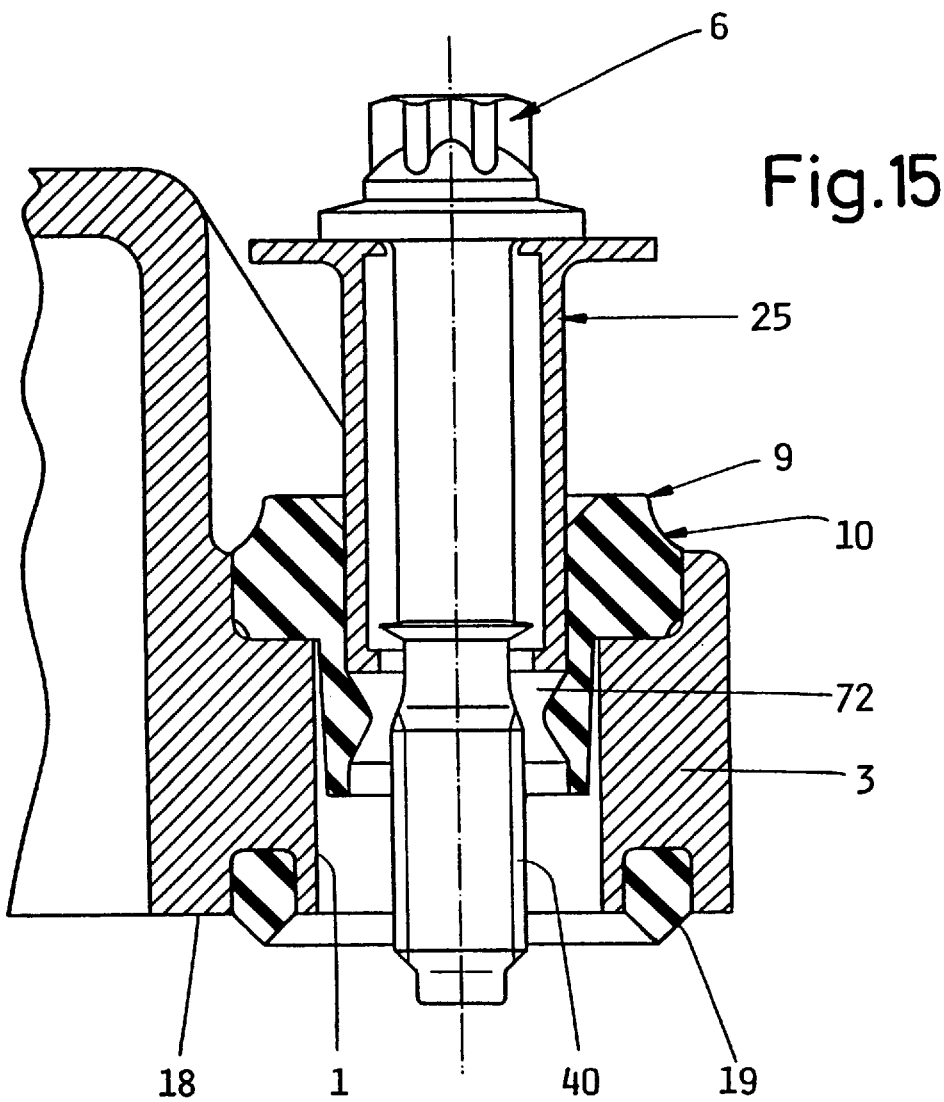
FIG. 15, the assembly element of FIG. 14, with an assembly sleeve and a screw in their preassembled state.
Figure 16:
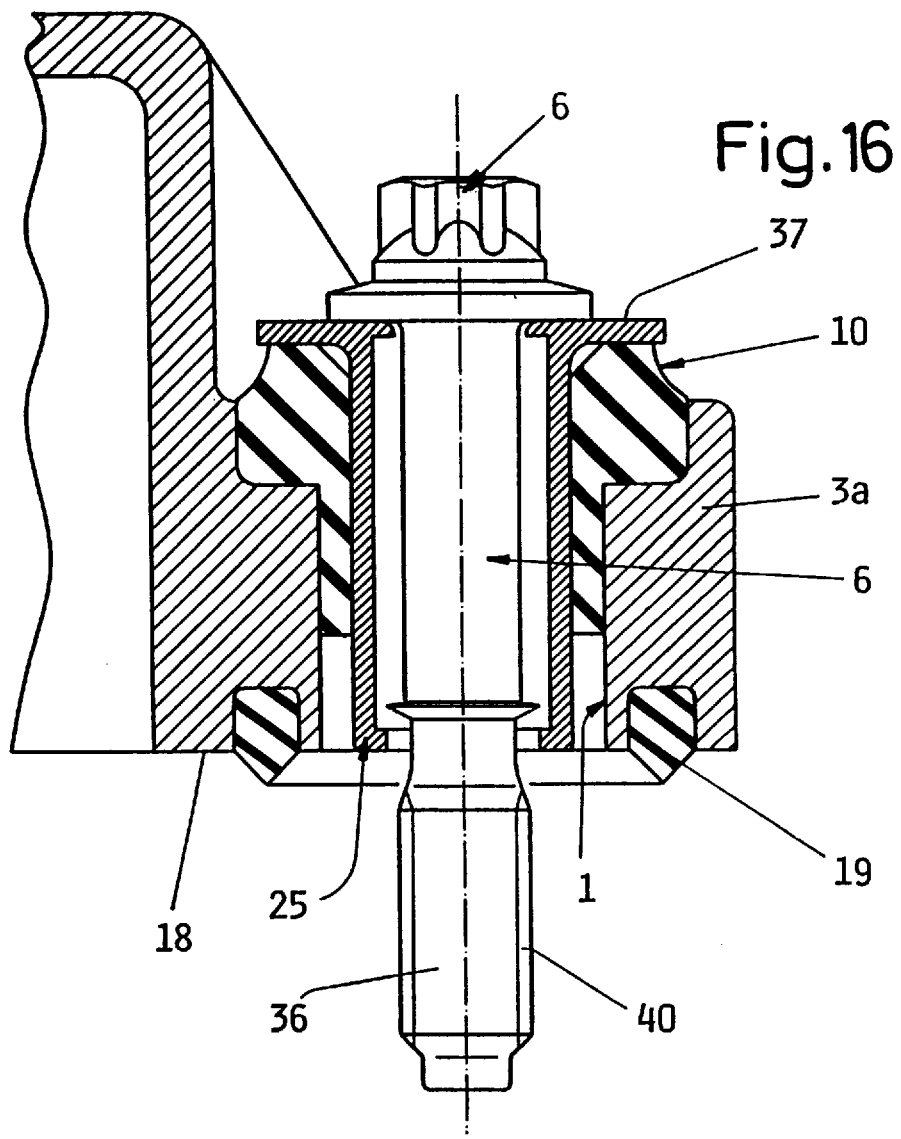
FIG. 16, the arrangement of FIG. 15 in its assembled state.

In the exemplary embodiments shown in FIGS. 14–16, the mounting hole 1 of the assembly element 3 has no undercut: here, the assembly sleeve and the cuff are fastened in a different way in the mounting hole of the assembly element. Protruding radially inward from the inner wall of the through hole 24 of the cuff 10 is an annular protrusion, which is called a clamping protrusion 72 hereinafter. In the present example, the clamping protrusion 72 is disposed in the lower half of the through hole 24, that is, the half remote from the cuff head 9. The wall region of the through hole 24 adjoining the clamping protrusion toward the bolt head 9 forms the prefastening region 30 described above. In the assembled state of FIG. 16, the inner wall of the through hole 24 is radially widened in the region of the clamping protrusion 72. In other words, the clamping protrusion 72 is flattened, so that the material of the cuff is compressed in this region. By this compression, because of elastic restoring forces, a nonpositive and positive fastening of both the cuff 10 and the assembly sleeve 25 in the mounting hole 1 is attained.

I claim:

1. An assembly arrangement comprising:
    an assembly element defining a mounting hole therein;
    a cuff adapted to be aligned with and inserted into the mounting hole of the assembly element in a vibration-damping manner, the cuff being made of an elastic rubber material and defining a through hole therein, the cuff further including:
    a cuff neck adapted to rest in the mounting hole of the assembly element and defining, over an entire length thereof, an outer circumferential surface extending essentially along a longitudinal axis of the cuff; and
    a fastening region having an inner wall which protrudes radially inwardly into the through hole in an unassembled state of the cuff and an outer wall, the fastening region extending over a portion of a circumference of the through hole; said inner wall of said fastening region having different diameters as viewed axially; said different diameters including a smallest diameter;
    an assembly sleeve adapted to be inserted into the through hole of the cuff and including an essentially cylindrical jacket for cooperating with said fastening region; said jacket having an outer diameter greater than said smallest diameter of said inner wall so that upon passage of said assembly sleeve through said fastening region, the assembly sleeve widens the inner wall of the fastening region in a radial direction thereby fastening the cuff and the assembly sleeve in the mounting hole; and
    a screw including:
        a screw shaft adapted to be inserted into the assembly sleeve; and
        a screw head adjacent the screw shaft, wherein the cuff is configured such that it is adapted to be acted upon in a tightening direction of the screw by at least one of the screw head and an annular collar of the assembly sleeve.

2. The assembly arrangement according to claim 1, wherein the fastening region is disposed adjacent an end region of the cuff neck.

3. The assembly arrangement according to claim 1, wherein:
    the assembly element defines an undercut in a region of its mounting hole, the undercut being disposed such that it flanks the fastening region of the cuff when the cuff rests in the mounting hole; and
    the inner wall of the fastening region tapers in the tightening direction of the screw and toward an end region of the cuff neck in an unassembled state of the cuff such that, when the jacket of the assembly sleeve is inserted into the through hole and passes the fastening region, the fastening region engages the undercut with its outer wall.

4. The assembly arrangement according to claim 3, wherein the undercut includes an annular protrusion protruding radially inwardly into the mounting hole, the annular protrusion thereby defining a bottleneck in the mounting hole.

5. The assembly arrangement according to claim 4, wherein the cuff neck has an outer diameter over an entire length thereof which is one of less than and substantially equal to a diameter defined by the bottleneck.

6. The assembly arrangement according to claim 4, wherein:

the assembly element includes a head end; and the annular protrusion is disposed in the mounting hole at the head end of the assembly element near the screw head.

7. The assembly arrangement according to claim 4, wherein the assembly element includes a wall region extending from a top side of the annular protrusion in a direction counter to the tightening direction thereby defining a cylindrical jacket face annularly encompassing the annular protrusion.

8. The assembly arrangement according to claim 3, wherein the mounting hole has a head region and an end region remote from the head region, the undercut being formed by an edge region of the end region of the mounting hole.

9. The assembly arrangement according to claim 8, wherein the fastening region defines a plurality of radial slits, the fastening region thereby having a plurality of segmental back-engagement parts disposed in a rosette configuration about the longitudinal axis of the cuff.

10. The assembly arrangement according to claim 9, wherein the back-engagement parts taper in a wedge-like manner toward an end region of the cuff neck.

11. The assembly arrangement according to claim 9, wherein the back engagement parts, in a final assembled state of the assembly arrangement, are adapted to rest as damping elements between the assembly element and a counterpart structure to which the assembly arrangement is configured to be connected.

12. The assembly arrangement according to claim 3, wherein the mounting hole has a head region and an end region remote from the head region, the end region defining a radially outwardly extending annular shoulder forming the undercut.

13. The assembly arrangement according to claim 1, wherein:

the cuff includes a flange-like cuff head; and the assembly element includes a head end defining a receptacle for receiving the cuff head therein, the receptacle corresponding to a radial widening of the mounting hole toward the head end of the assembly element.

14. The assembly arrangement according to claim 13, wherein a top side of the annular protrusion toward the screw head is co-planar with a bottom face of the receptacle.

15. The assembly arrangement according to claim 1, wherein the assembly element includes a bearing face, the assembly arrangement further comprising a damping lip protruding from the bearing face and annularly encompassing the mounting hole.

16. The assembly arrangement according to claim 15, wherein the damping lip is wedge-shaped in a longitudinal cross section thereof.

17. The assembly arrangement according to claim 15, wherein the assembly element defines an annular groove in the bearing face thereof, the damping lip resting in the annular groove.

18. The assembly arrangement according to claim 1, wherein the cuff is configured to be fastened to the assembly sleeve so as to be located outside the mounting hole of the assembly element in a preassembled state of the assembly arrangement.

19. The assembly arrangement according to claim 1, wherein a head end region of the cuff disposed in the through hole and adjacent the fastening region toward a head end of the cuff is configured such that, when the assembly sleeve is inserted into the through hole, it is fastened therein by a frictional engagement with the head end region of the cuff.

20. The assembly arrangement according to claim 1, wherein one of the cuff and the assembly sleeve are configured for positive engagement with one another and the cuff includes a plurality of radially protruding fastening bumps.

21. The assembly arrangement according to claim 20, wherein the assembly element defines an undercut in a region of its mounting hole, the undercut being disposed such that it flanks the fastening region of the cuff when the cuff is inserted into the mounting hole, the undercut further including an annular protrusion protruding radially inwardly into the mounting hole from an end of the assembly element remote from a head of the jacket of the assembly sleeve.

* * * * *